No. 763,342. PATENTED JUNE 21, 1904.
E. O. DOAK.
LAND MARKER.
APPLICATION FILED FEB. 13, 1904.
NO MODEL. 2 SHEETS—SHEET 1.

Witnesses: Inventor: Egbert O. Doak,
By Thomas G. Orwig, Attorney.

No. 763,342. PATENTED JUNE 21, 1904.
E. O. DOAK.
LAND MARKER.
APPLICATION FILED FEB. 13, 1904.
NO MODEL. 2 SHEETS—SHEET 2.
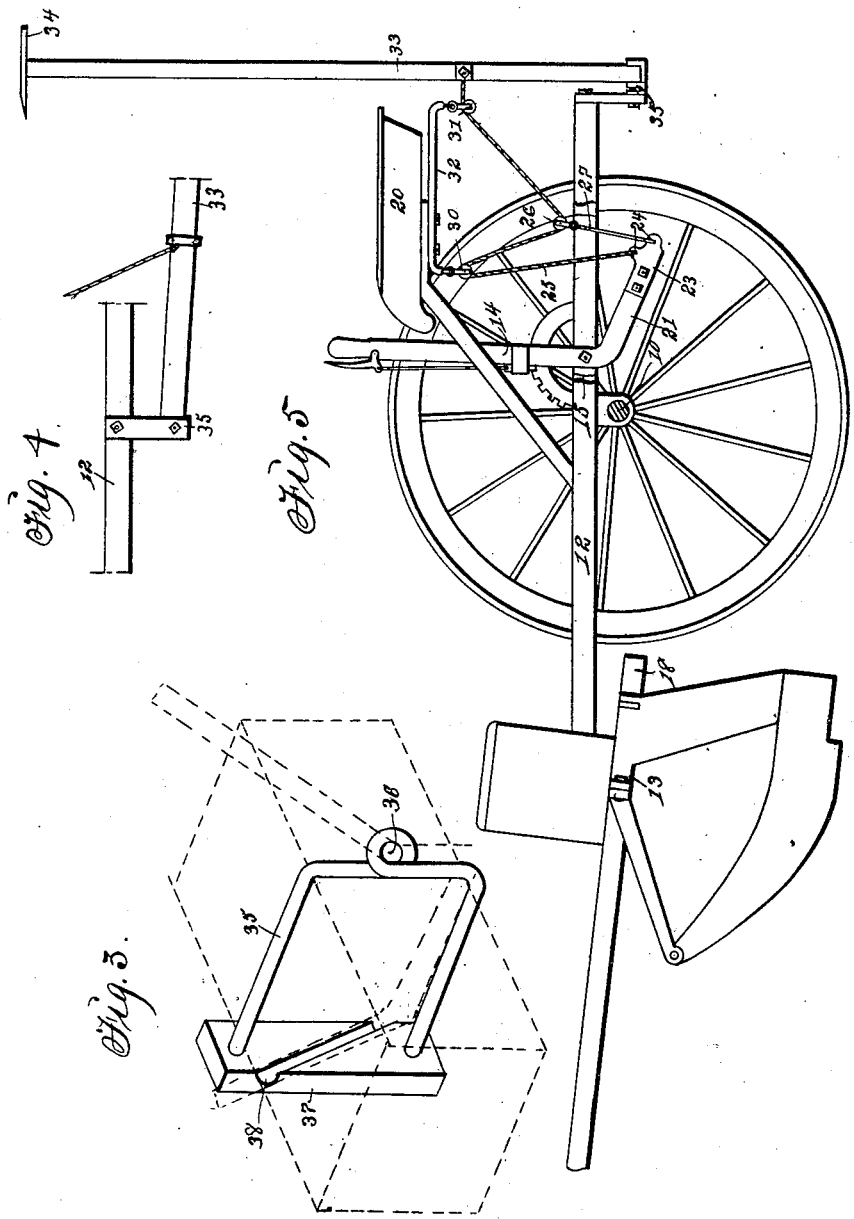
Witnesses:
L. L. Leibrock
R. H. Orwig
Inventor: Egbert O. Doak,
By Thomas O. Orwig, Attorney.

No. 763,342. Patented June 21, 1904.

UNITED STATES PATENT OFFICE.

EGBERT O. DOAK, OF SAC CITY, IOWA, ASSIGNOR TO REVERSIBLE MARKER MANUFACTURING COMPANY, OF SAC CITY, IOWA.

LAND-MARKER.

SPECIFICATION forming part of Letters Patent No. 763,342, dated June 21, 1904.

Application filed February 13, 1904. Serial No. 193,470. (No model.)

*To all whom it may concern:*

Be it known that I, EGBERT O. DOAK, a citizen of the United States, residing at Sac City, in the county of Sac and State of Iowa, have invented a new and useful Land-Marker, of which the following is a specification.

My object is to provide a simple, strong, and durable mechanism specially adapted for lifting, reversing, and carrying inoperative a land-marker at the same time that the runners are elevated, as required in turning about at the ends of a field.

My invention consists in the construction, arrangement, and combination of a tackle and lever with a marker and mechanism for lifting the runners, as hereinafter set forth, pointed out in my claims, and illustrated in the accompanying drawings, in which—

Figure 1:
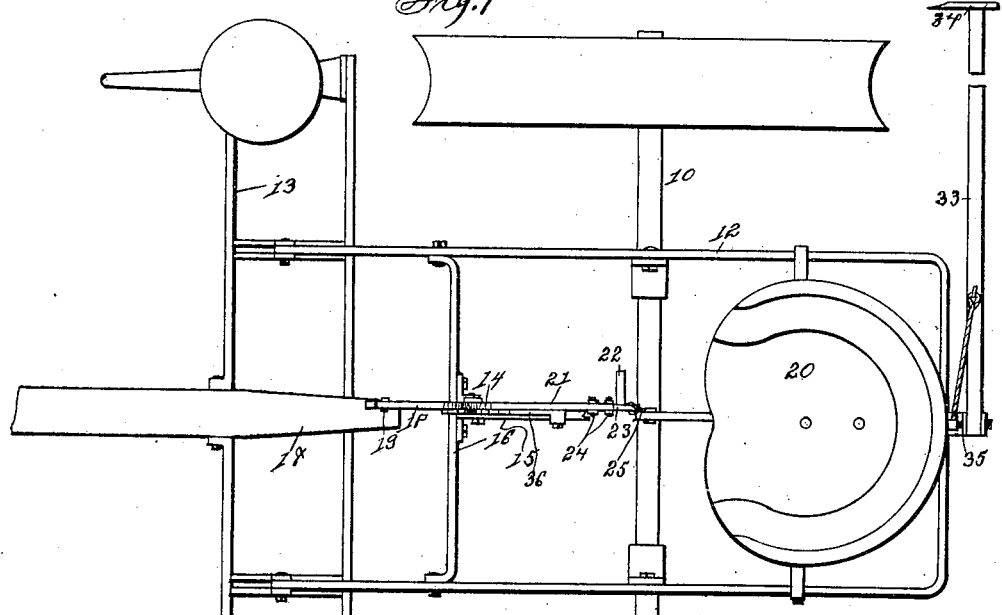
Figure 2:
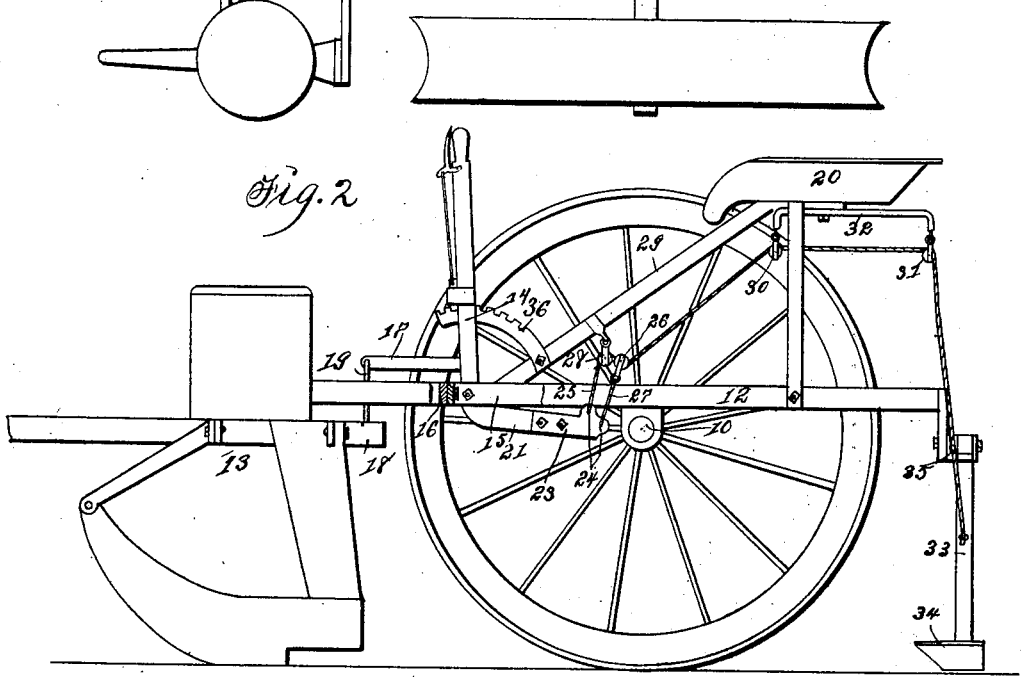

Figure 1 is a top view of a planter and shows the position of my attachment relative to the driver's seat and the mechanism for lifting the runners. Fig. 2 is a side view of the planter, partly in section, to disclose my marker-lifting attachment as combined with the carriage-frame and the mechanism for elevating and holding the runners inoperative. Fig. 3 is a perspective view of a device for detachably and adjustably connecting the end of a rope with the reversible marker-carrier. Fig. 4 is a detail view that shows the rope-fastening device applied as required in practical use. Fig. 5 shows a modified construction in which only three pulleys are used and the tackle located in rear of the carriage-axle in place of four, as shown in Fig. 2.

The numeral 10 designates the carriage-axle, and 12 the carriage-frame, preferably made of metal, and 13 is the runner-frame, adjustably connected with the frame 12, as shown or in any suitable way, in such a manner that the runner-frame and runners can be lifted and carried inoperative.

An elbow-shaped lever 14 is fulcrumed to the center bar 15 and a cross-piece 16 of the carriage-frame and has an arm 17 that extends forward and is adjustably connected with the rear end of the pole 18 by means of a coil spring or link 19, as required, for lifting the runners by pulling the lever rearward by hand by a person seated on the driver's seat 20. The lever 14 also has an arm 21 at its lower end extending rearward and a lateral projection 22 at its rear end, that serves as a treadle upon which a driver on the seat can place his feet and by foot-pressure lift and retain elevated the runners, as required in turning about at the end of a field.

An extension 23, fixed to the short arm 21 of the lever 14, has an integral perforated lug 24, adapted for connecting a rope 25 therewith, and a perforation in its end for pivotally connecting a pulley 26 therewith by means of a link 27.

A pulley 28 is connected with the seat-support 29, and pulleys 30 and 31 are connected with a bar 32, fixed under the seat, and the cable or rope 25 extended over the pulley 28 and under the pulley 26 and from thence over the pulleys 30 and 31 and then fastened to the reversible bar 33, that carries the marker 34 fixed to its free end, preferably as indicated in Fig. 3 or in any suitable way.

A U-shaped bolt 35 has an eye 36, and its ends are screw-threaded and extended through apertures in a clamp 37 and adjustably fastened to the clamp by means of nuts on the said ends. A groove 38 in the inside face of the clamp admits the end portion of the rope to be clamped fast when the device is placed on the bar 33, as indicated in Fig. 3.

The bar 33 is pivotally connected with a bearer 35, fixed to the rear and center of the carriage-frame.

A rack 36 is fixed to the seat-support and a pawl connected with the lever 14, as required for retaining the lever in a fixed position and the marker in an elevated inoperative position.

In the practical use of my invention the pulling back of the lever 14 by hand or depressing its arm 21 by foot-pressure upon the treadle 22 will lift the runners and also at the same time lift and reverse the pivoted and reversible marker-bar 33, that is connected with the lever by the rope 25, extended over the pulleys, so that the driver can remain on his seat in turning about at the end of the field, and after he has turned the planter about for a return trip he can then relax the lifting force he has applied and reverse the position of the marker.

Having thus set forth the purpose of my invention and its construction, application, and operation, what I claim as new, and desire to secure by Letters Patent, is—

1. In a corn-planter, a marker-carrier pivotally connected with the rear end and center of the carriage-frame, a rope fixed to the said marker-carrier, a pulley-bearer in a fixed position under the seat, a pulley connected with each end of said bearer, a lever fulcrumed to the carriage-frame in front of the seat, a pulley connected with the lever and the rope connected with the pulley and attached to the short arm of the lever, arranged and combined to operate in the manner set forth for the purposes stated.

2. In a corn-planter, a marker-carrier pivotally connected with the rear end and center of the carriage-frame, a rope fixed to the said marker-carrier, a pulley-bearer in a fixed position under the seat, a pulley connected with each end of said bearer, a lever fulcrumed to the carriage-frame in front of the seat, a pulley connected with the lever and the rope connected with the pulley and attached to the short arm of the lever, and means for retaining the lever stationary, arranged and combined to operate in the manner set forth for the purposes stated.

3. In a corn-planter, a bar for carrying a marker pivotally connected with the rear and center of a carriage-frame, a rope-fastening device consisting of a U-shaped bolt and a clamp having perforations at its end portion and a transverse groove in its inside face and a rope detachably and adjustably placed in said groove and fastened to said bar in the manner set forth for the purposes stated.

4. In a corn-planter, a marker-carrier pivotally connected with the rear end and center of the carriage-frame, a rope fixed to the said marker-carrier, a pulley-bearer in a fixed position under the seat, a pulley connected with each end of said bearer, an elbow-shaped lever having an arm projecting forward fulcrumed to the carriage-frame in front of the seat, a runner-frame hinged to the front of the carriage-frame, a link connecting said arm with the rear end of a pole fixed to the runner-frame, a pulley connected with the lever and the rope connected with the pulleys and attached to the short arm of the lever, arranged and combined to operate in the manner set forth for the purposes stated.

EGBERT O. DOAK.

Witnesses:
E. E. HARTER,
J. G. CAMPFIELD.